(12) United States Patent
Nielson et al.

(10) Patent No.: US 9,265,232 B2
(45) Date of Patent: Feb. 23, 2016

(54) EAR TAG ASSEMBLY AND METHOD OF MANUFACTURE

(71) Applicant: Y-Tex Corporation, Cody, WY (US)

(72) Inventors: Glenn Arden Nielson, Cody, WY (US); Ronald K. Knapp, Cody, WY (US)

(73) Assignee: Y-TEX CORPORATION, Cody, WY (US)

( * ) Notice: Subject to any disclaimer, the term of this patent is extended or adjusted under 35 U.S.C. 154(b) by 0 days.

(21) Appl. No.: 14/377,327

(22) PCT Filed: Feb. 27, 2013

(86) PCT No.: PCT/US2013/027906
§ 371 (c)(1),
(2) Date: Aug. 7, 2014

(87) PCT Pub. No.: WO2013/130523
PCT Pub. Date: Sep. 6, 2013

(65) Prior Publication Data
US 2015/0007467 A1    Jan. 8, 2015

Related U.S. Application Data

(60) Provisional application No. 61/603,530, filed on Feb. 27, 2012.

(51) Int. Cl.
*G09F 3/06*    (2006.01)
*A01K 11/00*    (2006.01)

(52) U.S. Cl.
CPC ............. *A01K 11/001* (2013.01); *Y10T 156/10* (2015.01)

(58) Field of Classification Search
CPC . A01K 11/001; A01K 11/002; A01K 11/004; G09F 3/12
USPC .................... 206/338–346; 53/446
See application file for complete search history.

(56) References Cited

U.S. PATENT DOCUMENTS

| | | | | |
|---|---|---|---|---|
| 2,096,559 A | * | 10/1937 | Riley | 16/225 |
| 3,931,667 A | * | 1/1976 | Merser et al. | 206/346 |
| 4,039,078 A | * | 8/1977 | Bone | 206/343 |
| 4,106,230 A | * | 8/1978 | Martinez | 40/773 |
| 4,253,258 A | * | 3/1981 | Engelstein | 40/771 |
| 4,320,591 A | * | 3/1982 | Dorman | 40/398 |
| 4,333,566 A | * | 6/1982 | Holmes | 206/343 |

(Continued)

FOREIGN PATENT DOCUMENTS

| | | |
|---|---|---|
| BY | 4871 C1 | 12/2002 |
| EP | 0274730 A2 | 7/1988 |
| JP | 2010161959 A | 7/2010 |

OTHER PUBLICATIONS

International Search Report and Written Opinion for PCT/US2013/027906, mailed May 16, 2013; ISA/RU.

*Primary Examiner* — Shin Kim
(74) *Attorney, Agent, or Firm* — Harness, Dickey & Pierce, P.L.C.

(57) ABSTRACT

A plurality of ear tags is provided and may include a panel portion and a relatively narrow neck portion extending from the panel portion. The plurality of ear tags may be arranged so that the panel portions of adjacent ear tags are at least partially overlapped and edges of the neck portions of adjacent ear tags are juxtaposed and attached to one another at an attachment location at the edges of the neck portions of the adjacent ear tags.

22 Claims, 7 Drawing Sheets

(56) References Cited

U.S. PATENT DOCUMENTS

| | | | |
|---|---|---|---|
| 4,429,437 A * | 2/1984 | Paradis | 206/346 |
| 4,470,212 A * | 9/1984 | Stafford et al. | 40/301 |
| 4,514,919 A * | 5/1985 | Plutsky | 40/771 |
| 4,660,718 A * | 4/1987 | Kato et al. | 206/343 |
| 4,712,677 A * | 12/1987 | Russell | 206/345 |
| 5,014,847 A * | 5/1991 | Droguet | 206/279 |
| 5,137,149 A * | 8/1992 | Polacek | 206/278 |
| 5,967,316 A * | 10/1999 | Abbruzzese et al. | 206/343 |
| 6,047,823 A * | 4/2000 | Deschenes et al. | 206/338 |
| 6,173,836 B1 * | 1/2001 | Cooper | 206/346 |
| 6,439,169 B1 * | 8/2002 | Miyawaki | 119/858 |
| 6,779,958 B2 * | 8/2004 | Rosenbaum | 411/442 |
| 6,811,632 B2 * | 11/2004 | Nelson et al. | 156/73.5 |
| 6,971,515 B2 * | 12/2005 | Cooper et al. | 206/343 |
| 6,987,019 B1 * | 1/2006 | Rogalsky | 435/299.2 |
| 7,207,095 B2 * | 4/2007 | Bruins et al. | 29/453 |
| 7,308,983 B2 * | 12/2007 | Shilale et al. | 206/346 |
| 7,556,138 B2 * | 7/2009 | Kim | 198/408 |
| 7,963,393 B2 * | 6/2011 | Nakagawa et al. | 206/343 |
| 8,192,825 B2 * | 6/2012 | Shilale et al. | 428/99 |
| 8,657,172 B2 * | 2/2014 | Cooper | 227/67 |
| 2002/0066418 A1 * | 6/2002 | Fearing et al. | 119/859 |
| 2002/0195361 A1 * | 12/2002 | Fukami | 206/343 |
| 2008/0164271 A1 * | 7/2008 | Cooper et al. | 221/1 |
| 2009/0050497 A1 * | 2/2009 | Chang | 206/292 |
| 2009/0160620 A1 * | 6/2009 | August et al. | 340/10.3 |
| 2011/0041367 A1 * | 2/2011 | Bladen et al. | 40/300 |
| 2012/0279100 A1 * | 11/2012 | Burout et al. | 40/299.01 |
| 2015/0007467 A1 * | 1/2015 | Nielson et al. | 40/301 |

* cited by examiner

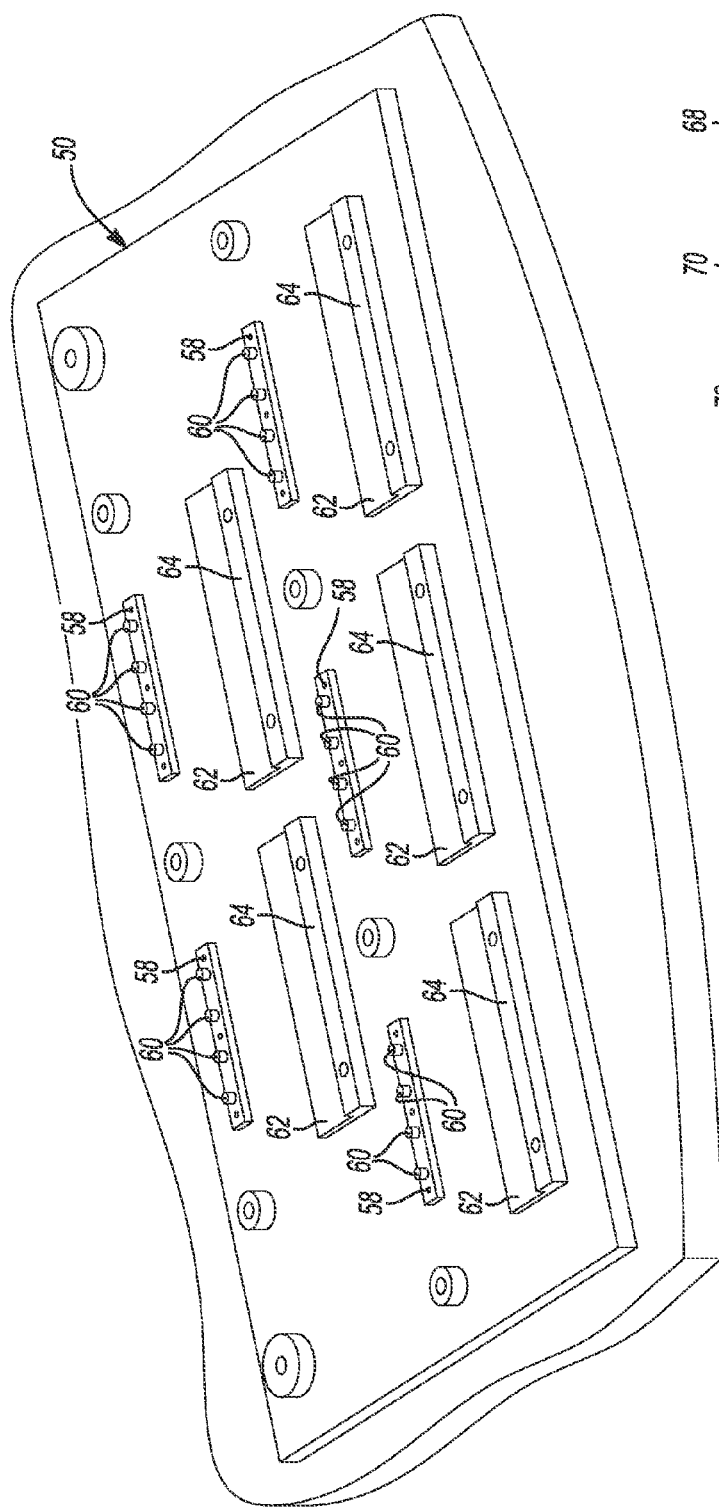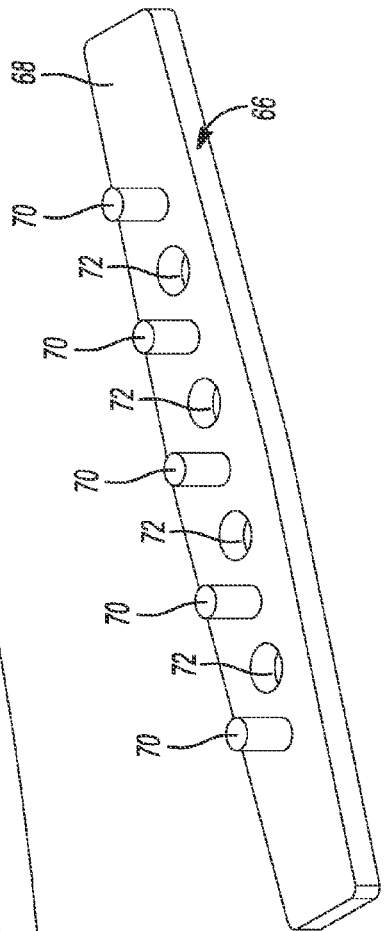

though. Therefore, tag runners not only increase material costs but also require development and maintenance of tooling required to manufacture the tag runners. Further, assembly of
EAR TAG ASSEMBLY AND METHOD OF MANUFACTURE

CROSS-REFERENCE TO RELATED APPLICATIONS

This application claims the benefit of U.S. Provisional Application No. 61/603,530, filed on Feb. 27, 2012. The entire disclosure of the above application is incorporated herein by reference.

FIELD

The present disclosure relates to ear tags and more particularly to a method for joining individual ear tags.

BACKGROUND

This section provides background information related to the present disclosure which is not necessarily prior art.

Ear tags are conventionally used in a wide variety of applications to identify and differentiate between animals. Ear tags are typically inserted into and through an ear of an animal and may include a number or other marking identifying the particular animal. The number or other marking can be applied by an ear-tag manufacturer prior to packaging or, alternatively, can be applied on-site by the end user prior to or following installation of the ear tag. If the number or marking is applied to the ear tags by the ear-tag manufacturer, care must be taken to ensure that the ear tags remain in sequential order throughout assembly, packaging, and delivery to allow the end user to sequentially tag animals, if desired.

Ear-tag manufacturers typically maintain proper sequencing of ear tags following assembly by attaching sequenced tags to so-called "tag runners." Tag runners typically include a plastic substrate having a series of posts that receive apertures of respective ear tags to maintain a position of the ear tags relative to one another during packaging and shipment to the end user. For example, a tag runner may include eight (8) posts that are spaced apart from one another and extend along the substrate of the tag runner. In the foregoing example, each post receives an aperture of an individual ear tag to maintain the proper sequence of eight (8) individual ear tags up and until the ear tags are removed from the tag runner by the end user.

While conventional tag runners adequately maintain a desired sequence of the ear tags prior to installation on an animal, such tag runners add to the overall cost and complexity associated with manufacturing the ear tags. Specifically, tag runners are conventionally formed from a plastic material and must be separately formed from the ear tags themselves. Therefore, tag runners not only increase material costs but also require development and maintenance of tooling required to manufacture the tag runners. Further, assembly of the individual tags to the tag runners must be performed following formation of the individual tags and, as a result, increases the number of steps required to manufacture and package the ear tags.

In addition to increasing manufacturing cost and complexity, tag runners also negatively impact the environment, as most are discarded following removal and installation of the ear tags. While the material used in manufacturing the tag runners is typically recyclable, recycling tag runners requires individual end users to properly coordinate such efforts and requires recycling companies to consume energy when converting the discarded tag runners into a useable product or re-useable material. In short, while tag runners adequately maintain a desired sequence of individual ear tags, such tag runners increase the cost and complexity of manufacturing and packaging ear tags and, further, are typically discarded or otherwise require recycling following installation of the ear tags on an animal.

SUMMARY

This section provides a general summary of the disclosure, and is not a comprehensive disclosure of its full scope or all of its features.

The present disclosure is directed to an ear tag assembly and a corresponding method of manufacturing an ear tag assembly comprised of individually separate ear tags. As used herein, the term "individually separate" means ear tags that were either manufactured separately, or if manufactured together, are subsequently separated prior to joinder in accordance with the present disclosure.

In one configuration, a plurality of ear tags is provided and may include a panel portion and a relatively narrow neck portion extending from the panel portion. The plurality of ear tags may be arranged so that the panel portions of adjacent ear tags are at least partially overlapped and edges of the neck portions of adjacent ear tags are juxtaposed and attached to one another at an attachment location at the edges of the neck portions of the adjacent ear tags.

A method is provided and may include forming a plurality of individually separate ear tags each having a panel portion and a relatively narrow neck portion extending from the panel portion. The method may further include arranging the plurality of ear tags so that the panel portions of adjacent ear tags are partially overlapped, arranging the plurality of ear tags so that edges of the neck portions of adjacent ear tags are juxtaposed, and attaching the edges of the neck portions of the adjacent ear tags.

Another method is provided and may include forming a plurality of individually separate ear tags each having a panel portion and a relatively narrow neck portion extending from the panel portion. The method may further include arranging the plurality of ear tags so that the panel portions of adjacent ear tags are partially overlapped, arranging the plurality of ear tags so that the neck portions of adjacent ear tags are in contact with one another, and welding the plurality of individual ear tags to one another at the neck portions.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 is a perspective view of a lower tool in accordance with the principles of the present disclosure for use with the upper tool of FIG. 4;

FIG. 6 is a perspective view of a carrier for use in aligning individual ear tags prior to attachment of the ear tags via the tools of FIGS. 4 and 5;

Corresponding reference numerals indicate corresponding parts throughout the several views of the drawings.

DETAILED DESCRIPTION

Figure 1:
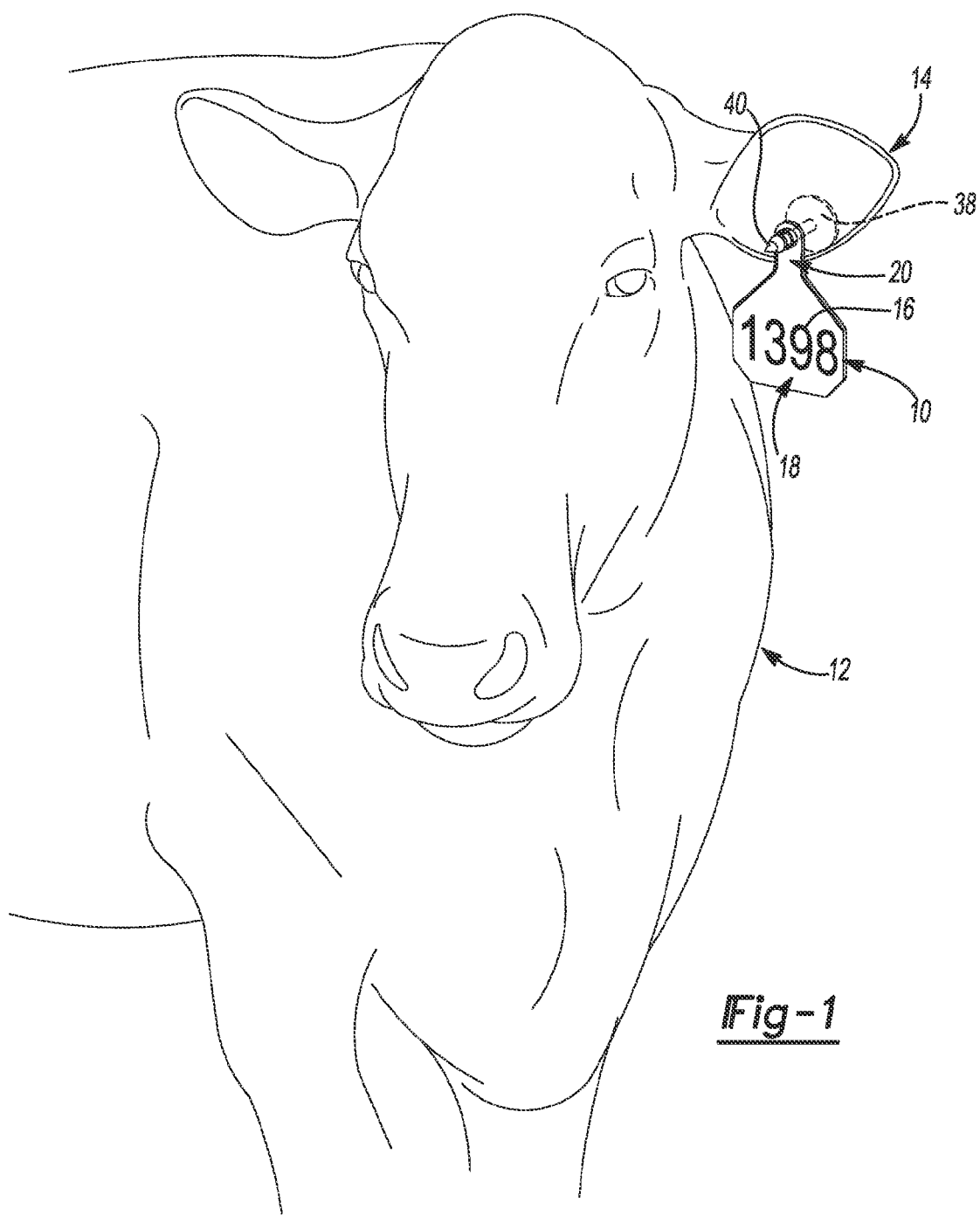
FIG. 1 is a partial perspective view of an ear tag in accordance with the principles of the present disclosure installed on an ear of an animal.

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to the figures, an ear tag 10 is provided for use in identifying an animal 12. The ear tag 10 may be inserted through at least one ear 14 of the animal 12 and may include a number or other indicia 16 that identifies the animal 12.

The ear tag 10 may include a panel or display portion 18 and a relatively narrow neck portion 20 extending from the panel portion 18. The panel portion 18 may include a front surface 22 and a rear surface 24 formed on an opposite side of the panel portion 18 than the front surface 22. The front surface 22 and/or the rear surface 24 may include the indicia 16 printed thereon for use in identifying the animal 12 once the ear tag 10 is installed on the ear 14.

Figure 2:
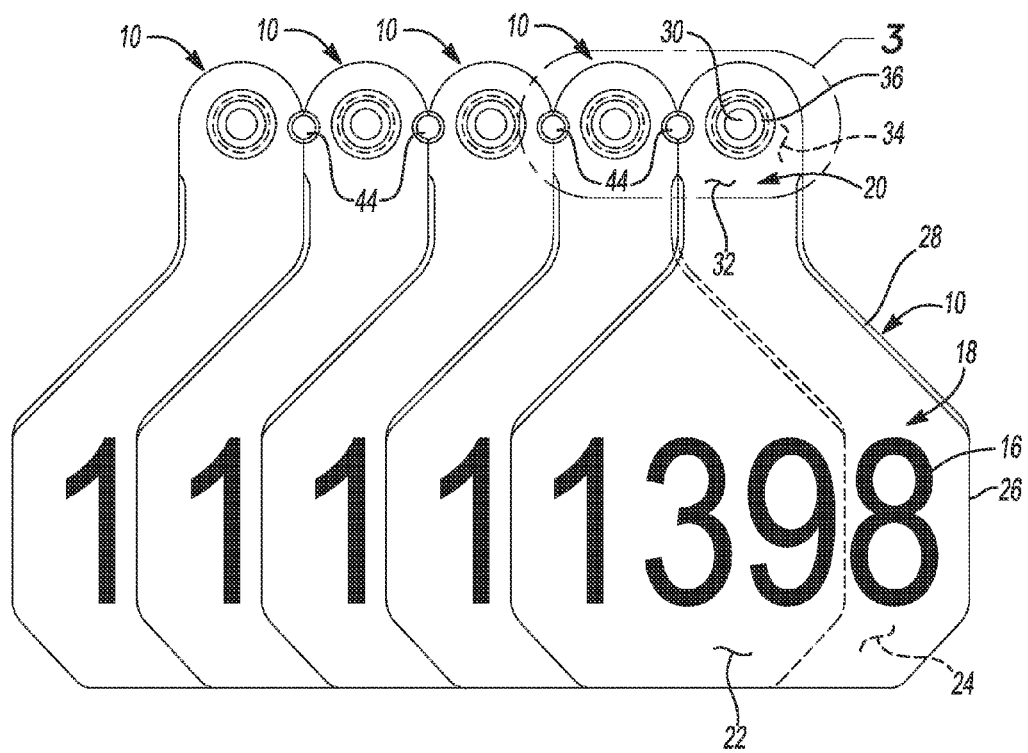
FIG. 2 is a front view of a plurality of ear tags in accordance with the principles of the present disclosure attached to one another at an attachment location by a method in accordance with the principles of the present disclosure.

The panel portion 18 may additionally include an outer edge 26 and a rib 28. The outer edge 26 generally surrounds an outer perimeter of the panel portion 18 and serves to define the overall shape of the panel portion 18. The rib 28 may be formed by including a localized region of increased thickness at the outer edge 26 of the panel portion 18 and may be formed such that the rib 28 only extends over a portion of the panel portion 18 to provide the panel portion 18 with a desired rigidity. As shown in FIG. 2, the rib 28 may partially extend into both the panel portion 18 and the neck portion 20 to locally strengthen a joint between the panel portion 18 and neck portion 20 to provide the ear tag 10 with an overall, desired rigidity. Providing the ear tag 10 with a degree of rigidity allows the front surface 22 and rear surface 24 of the panel portion 18 to remain substantially flush with the neck portion 20 in an effort to increase the visibility of the indicia 16 printed on one or both of the front surface 22 and rear surface 24 once the ear tag 10 is installed on the animal 12.

The neck portion 20 may include an aperture 30, a front surface 32, a rear surface 34, and a collar 36. The aperture 30 may be formed through the neck portion 20 such that the aperture 30 extends between and through the front surface 32 and the rear surface 34. The collar 36 may be received by the aperture 30 and may be fixed for movement with the neck portion 20 within the aperture 30. For example, the collar 36 may be molded into the neck portion 20 at the aperture 30 when the neck portion 20 is molded. Additionally or alternatively, the collar 36 may be attached to the neck portion 20 at the aperture 30 via an adhesive, for example. Regardless of how the collar 36 is retained within the aperture 30, the collar 36 may be positioned relative to the aperture 30 such that the collar 36 is coaxially aligned with the aperture 30.

The collar 36 may be formed from a different material than the neck portion 20 to provide the neck portion 20 with increased rigidity and strength. In one configuration, the collar 36 may be formed from a relatively rigid material when compared to the material of the neck portion 20 to locally strengthen and reinforce the area of the neck portion 20 proximate to the aperture 30. Forming the collar 36 from a relatively rigid material not only reinforces the neck portion 20 near the aperture 30 but also increases the overall rigidity of the neck portion 20. For example, the collar 36 may substantially prevent bending of the neck portion 20 above a flex line (FL) shown in FIG. 3. Therefore, the collar 36 not only increases the rigidity of the neck portion 20 in an area proximate to the aperture 30 but also serves to inhibit bending of the neck portion 20 above the flex line (FL), which may be disposed below an outer perimeter of the collar 36 depending on the size, shape, and material of the neck portion 20 and collar 36.

The collar 36 may be sized to receive a male portion or button 38 (FIG. 1) to secure the neck portion 20 and, thus, the panel portion 18, to the animal's ear 14. For example, the button 38 may include a pointed leading end 40 that pierces the animal's ear 14 and facilitates insertion of the button 38 into the collar 36. As shown in FIG. 1, insertion of the pointed end 40 of the button 38 into the collar 36 causes the pointed end 40 to extend from the collar 36 and retain the animal's ear 14 between the button 38 and the rear surface 34 of the neck portion 20. Cooperation between the button 38 and the collar 36 effectively restricts removal of the ear tag 10 from the animal's ear 14 while concurrently allowing the panel portion 18 to depend from the neck portion 20 and permit viewing of the indicia 16 located on one or both of the front surface 22 and rear surface 24 of the panel portion 18.

While the ear tag 10 is shown as being a two-piece ear tag including a neck portion 20 and separable button 38, the ear tag 10 could alternatively be a one-piece ear tag that has a stem (not shown) in place of the separable button 38 and collar 36. The stem may be integrally formed with the neck portion 20 and may include a cutting feature (not shown) that pierces and retains the animal's ear between the cutting feature and the neck portion 20 once installed. While the following description will be made with reference to the two-piece ear tag 10 shown in FIGS. 1-3, an identical process could be used to join one-piece ear tags.

The ear tag 10 may be formed via an injection-molding process, for example. As such, the panel portion 18 and neck portion 20 may be integrally formed of the same material. Further, the collar 36 may be attached to the aperture 30 of the neck portion 20 during formation of the panel portion 18 and neck portion 20.

Following formation of the panel portion 18 and neck portion 20, the ear tag 10 may be removed from the injection-molding machine (not shown) and may be printed with indicia 16 on one or both of the front surface 22 and rear surface 24 of the panel portion 18. In one configuration, the indicia 16 are numbers, whereby the numbers are sequentially applied to individual ear tags 10 which may then be used by the end user to sequentially label individual animals 12. Once the indicia 16 are printed on the individual ear tags 10, the ear tags 10 may be assembled together and subsequently packaged in a manner that maintains the proper sequencing of the individual ear tags 10 until the ear tags 10 are attached to the ears 14 of respective animals 12.

The individual ear tags 10 may be attached to one another at the neck portion 20 to ensure that the ear tags 10 remain in proper, sequential order following printing of the indicia 16. Namely, the neck portion of adjacent ear tags 10 may be brought into contact with one another such that edges 42 of adjacent neck portions 20 are juxtaposed or are in an abutting relationship.

Once the edges 42 of adjacent neck portions 20 are in an abutting relationship, the edges 42 may be joined to one another by a heat stake, tape, adhesive, or through a suitable process such as radio-frequency welding, ultrasonic welding, hot-gas welding, friction welding, laser welding, or spin welding. While any of the foregoing processes may be used to join neck portions 20 of adjacent ear tags 10, the neck portions 20 will be described and shown as being joined via radio-frequency welding.

Joining neck portions 20 of adjacent ear tags 10 may be performed by at least partially overlapping the panel portion 18 of adjacent ear tags 10 to allow the edges 42 of the respective neck portions 20 to be in an abutting relationship, as shown in FIG. 2. Once the panel portions 18 of the adjacent ear tags 10 are in an overlapping relationship such that the edges 42 of the adjacent neck portions 20 abut one another, heat may be locally applied to the edges 42 of the adjacent neck portions 20 in an effort to locally deform the edges 42 of each neck portion 20. Deforming the neck portions 20 of the adjacent ear tags 10 causes the material of the neck portions 20 to flow and mix, thereby joining the adjacent neck portions 20 once the material of each neck portion 20 is permitted to solidify.

Figure 3:
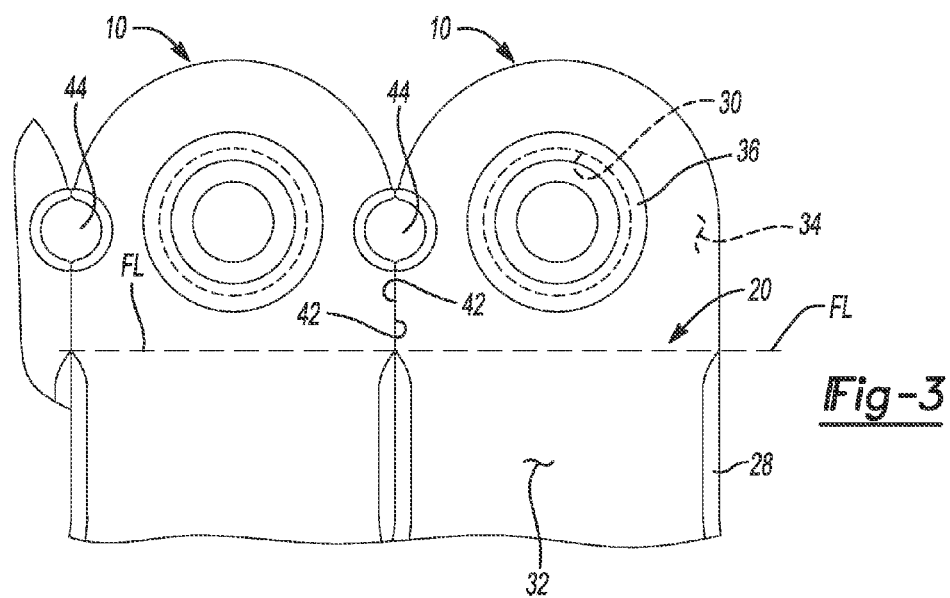
FIG. 3 is an enlarged view of a neck portion of the ear tags of FIG. 2 showing the attachment location disposed between adjacent neck portions.
Figure 4:
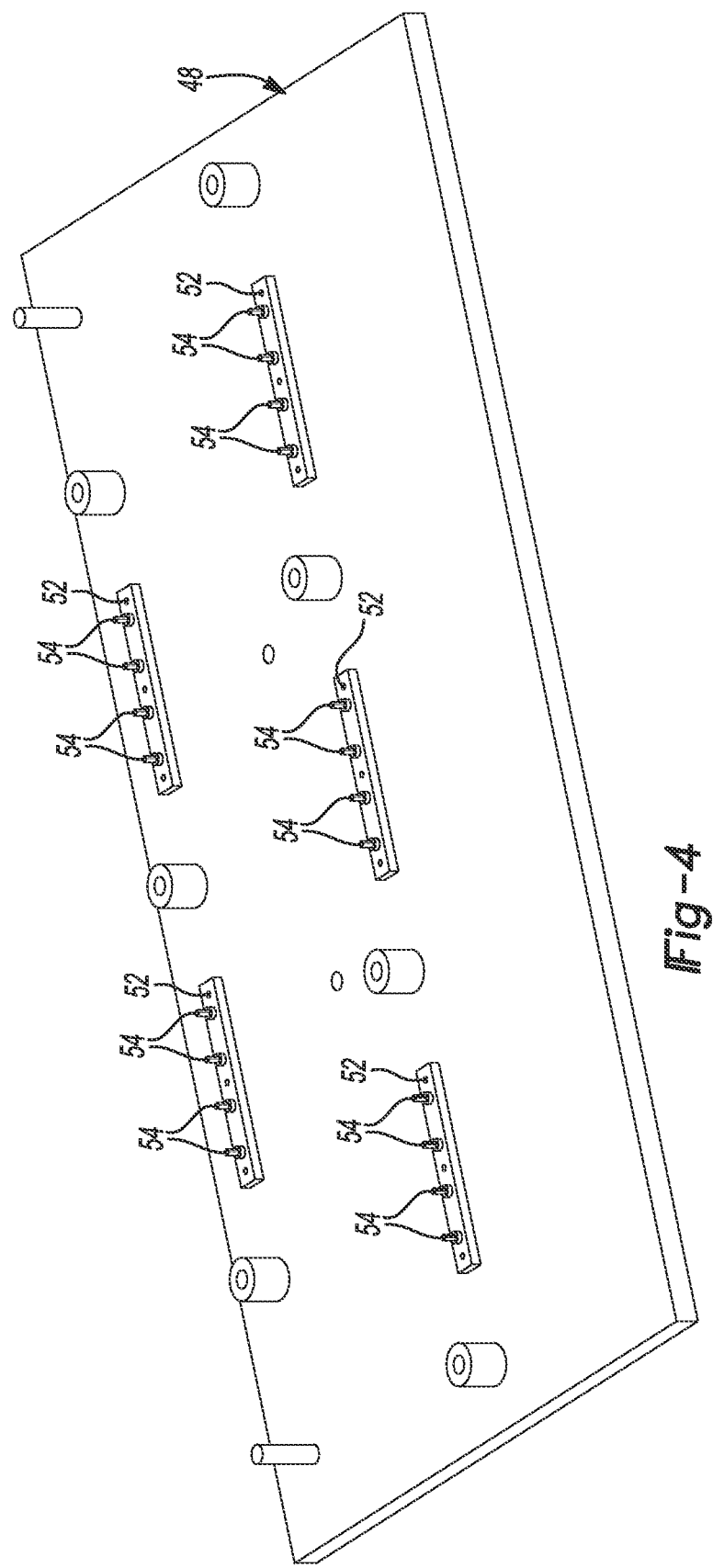
FIG. 4 is a perspective view of an upper tool in accordance with the principles of the present disclosure for use in joining ear tags.
Figure 7:
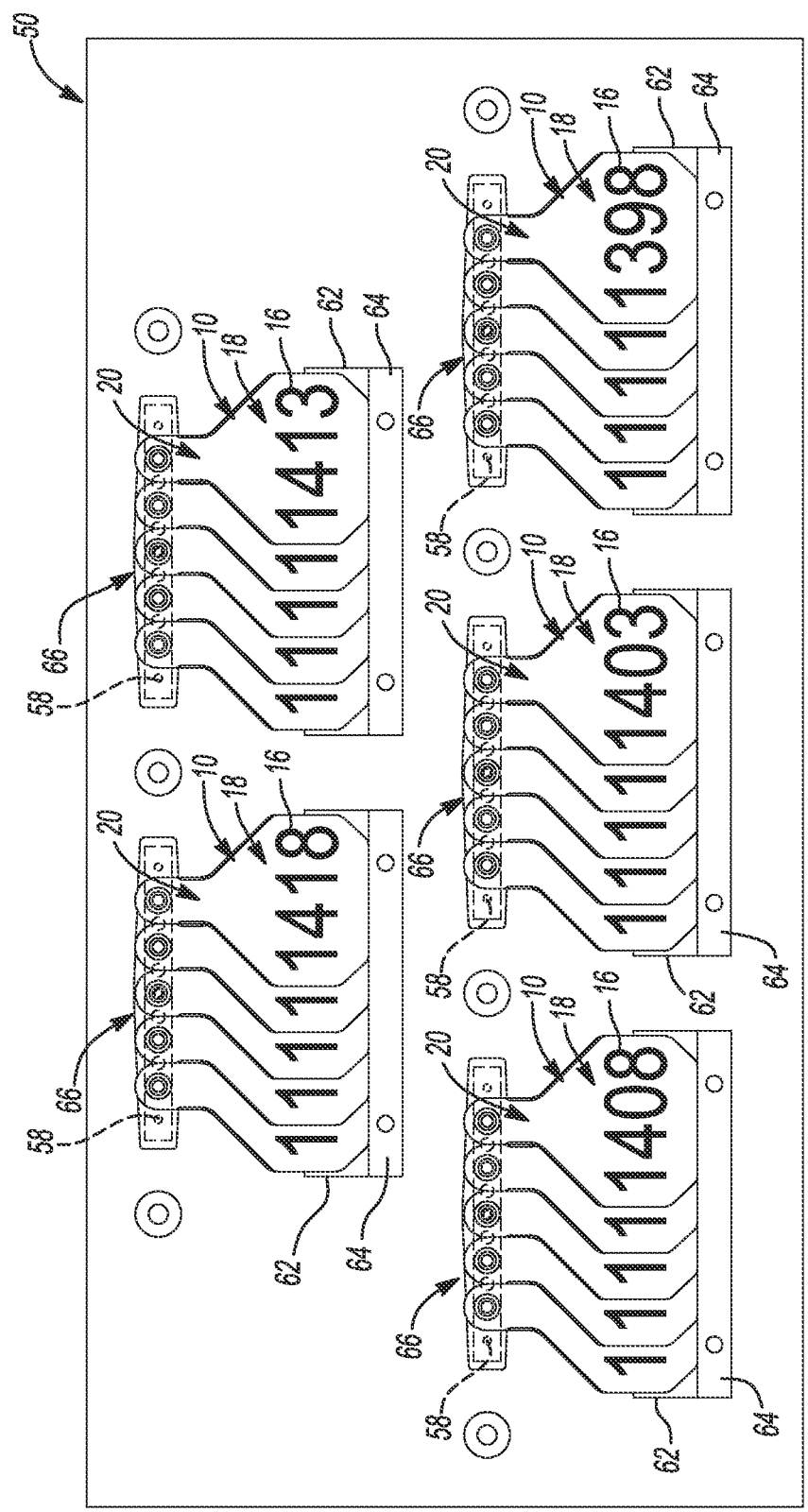
FIG. 7 is a front view of the lower tool of FIG. 5 having a plurality of individual ear tags disposed thereon prior to joining of adjacent ear tags.

Solidification of the edges 42 of the adjacent neck portions 20 creates an attachment location 44 disposed between the adjacent neck portions 20. The attachment location 44 may include any shape and is largely dependent on the shape of the weld tooling used to locally heat the edges 42 of the adjacent neck portions 20. For example, and as shown in FIGS. 2 and 3, weld tooling—such as radio frequency weld tooling—having a substantially circular anode/cathode may generate an attachment location 44 having a substantially circular shape located between and joining adjacent neck portions 20.

Regardless of the particular shape of the attachment location 44, the attachment location 44 may be located above the flex line (FL) in an effort to prevent inadvertent tearing of the attachment location 44 prior to intentional separation of the adjacent neck portions 20 by the end user. For example, the attachment location 44 may be aligned with the collars 36 of the neck portion 20 such that the attachment location 44 is positioned between adjacent collars 36. As described above, the collars 36 may be formed from a relatively rigid material and therefore serve to locally strengthen the neck portions 20 in an area surrounding the apertures 30. Therefore, positioning the attachment location 44 between collars 36 of adjacent neck portions 20 decreases the likelihood of bending at the neck portion 20 in an area proximate to the attachment location 44, which reduces the likelihood that the attachment location 44 will be inadvertently separated.

Forming the attachment location 44 in an area above the flex line (FL) of the neck portion 20 not only decreases the likelihood that the neck portions 20 will be inadvertently separated at the attachment location 44 but also maintains the desired appearance of the panel portion 18. Namely, because the attachment location 44 is located proximate to the collar 36 of the neck portion 20, the attachment location 44 is spaced apart and separated from the panel portion 18 and therefore does not hinder or impinge upon the indicia 16 of either the front surface 22 or rear surface 24 of the panel portion 18. In short, the front surface 22 and rear surface 24 of the panel portion 18 are completely unaffected by joining of adjacent neck portions 20 at the attachment location 44.

The neck portions 20 remain engaged with one another at the attachment location 44 until a force is applied to the neck portions 20 to sever the neck portions 20 at the attachment location 44. Specifically, a force may be applied to adjacent ear tags 10 in an effort to tear the neck portions 20 at the attachment location 44 to separate adjacent ear tags 10 prior to attachment of the ear tags 10 to an animal's ear 14. Tearing or shearing of the neck portions 20 at the attachment location 44 may be facilitated by providing the attachment location 44 with a reduced thickness when compared to a thickness of the neck portion 20. Further, forming the attachment location 44 proximate to the collars 36 further increases the likelihood that the adjacent ear tags 10 will be separated along the edges 42 of the neck portions 20 and at the attachment location 44—without causing damage to the neck portion 20 of either ear tag 10—as the attachment location 44 provides an area of relative weakness when compared to the surrounding neck portion 20 and associated collar 36. The ear tag 10 may be attached to an animal's ear 14 upon separation from an adjacent ear tag 10 and allows the end user to maintain a desired sequence of the ear tags 10 up and until attachment to an animal's ear 14.

With particular reference to FIGS. 4-9, a high-frequency welding apparatus 46 (FIG. 8) is provided. The welding apparatus 46 may include an upper tool 48 and a lower tool 50. The upper tool 48 may include a series of plates 52, each including a series of electrodes 54. In one configuration, each plate 52 includes four electrodes 54 that permit joining of five individual ear tags 10. The electrodes 54 may be formed from brass and may include a distal end 56 (FIG. 8) having virtually any shape. For example, the distal end 56 of each electrode 54 may include a substantially circular shape to provide an attachment location 44 between adjacent neck portions 20 with a substantially circular shape, as shown in FIG. 3. The electrodes 54 may be electrically coupled to a supply of electricity (not shown) to selectively energize the electrodes 54 when joining neck portions 20 of adjacent ear tags 10.

The lower tool 50 may likewise include a series of plates 58, each having a plurality of posts 60 extending therefrom. The posts 60 cooperate with the upper tool 48 to locally heat the edges 42 of adjacent neck portions 20 when forming the attachment locations 44 and, as such, are respectively associated with individual electrodes 54 of the upper tool 48. In short, the posts 60 form the bottom portion of the electrodes 54 and are formed from a material that permits the posts 60 to conduct electromagnetic energy.

The lower tool 50 may additionally include a series of supports 62 that are respectively associated with and are spaced apart from the plates 58. The supports 62 may include a shape that receives the overlapped panel portions 18 of the individual ear tags 10 prior to formation of the attachment locations 44 between adjacent neck portions 20. The supports 62 may be spaced apart from the plates 58 such that a bottom portion of the outer edge 26 of the panel portion 18 of each ear tag 10 rests against a projection 64 of each support 62. Engagement between the bottom portion of the outer edge 26 of each panel portion 18 properly locates each ear tag 10 relative to the plates 58 and associated posts 60 to allow the electrodes 54 and posts 60 to engage the edges 42 of adjacent neck portions 20 at a desired location. For example, the projections 54 may engage the outer edge 26 of each panel portion 18 to position the panel portion 18 and, thus, the neck portion 20 relative to the posts 60 such that the posts 60 and, thus, the electrodes 54, engage the edges 42 of adjacent neck portions 20 in an area adjacent to the collars 36 of the neck portions 20. Engagement between the electrodes 54 and the posts 60 along the edges 42 of adjacent neck portions 20 in an area proximate to the collars 36 causes the attachment location 44 to similarly be located adjacent to the collars 36.

In operation, the electrodes 54 are moved toward the posts 60, thereby sandwiching a portion of the adjacent neck portions 20 proximate to the abutted edges 42 of each neck portion 20. Current is then supplied to the electrodes 54, which passes from the electrodes 54 into the respective posts 60. In so doing, the electricity passes through the abutted neck portions 20 of adjacent ear tags 10, thereby causing the material of each neck portion 20 to flow in an area between the electrodes 54 and posts 60. Specifically, causing electricity to flow from the electrodes 54 to the posts 60 generates electromagnetic energy, thereby resulting in activation of the material of the neck portions 20. Activation of the material of the neck portions 20 causes the material of the adjacent neck portions 20 to mix and, once solidified, joins the neck portions 20 at the attachment location 44. Use of the electrodes 54 and posts 60 does not result in heating of the material of each neck portion 20 outside of an area of the electrodes 54 and posts 60, as the material of each neck portion 20 is heated from the inside out, as electromagnetic energy passes from the electrodes 54 to the posts 60.

The electrodes 54 may be moved away from the posts 60 once the material of the adjacent neck portions 20 is sufficiently activated and, thus, mixed together. For example, the electrodes 54 may be moved away from the posts 60 approximately five (5) to ten (10) seconds following activation of the electrodes 54. Once the electrodes 54 move away from the posts 60, the material of each neck portion 20 is permitted to solidify, thereby welding the adjacent neck portions 20 together.

A fixture 66 (FIG. 6) may be used to maintain alignment of the individual ear tags 10 prior to welding of the individual ear tags 10 at the neck portions 20. The fixture 66 may include a plate 68 that supports the individual ear tags 10 within the welding apparatus 46 generally between the upper tool 48 and the lower tool 50. The plate 68 may include a series of posts 70 extending therefrom and a series of apertures 72 extending therethrough. The posts 70 may include any number and may slidably receive respective collars 36 of each ear tag 10. For example, the fixture 66 shown in FIG. 6 includes five (5) posts 70 extending from the plate 68. Each of the posts 70 receives a respective collar 36 of an individual ear tag 10 to properly position the ear tags 10 relative to the plate 68 and, thus, relative to the upper tool 48 and lower tool 50 of the welding apparatus 46.

The apertures 72 may be respectively disposed between a pair of posts 70 and are aligned with the posts 60 of the lower tool 50 when the fixture 66 is positioned on the lower tool 50. The posts 60 extend into the apertures 72 to allow the posts 60 to oppose the abutted edges 42 of adjacent neck portions 20 and, further, to allow electromagnetic energy to flow from the electrodes 54 through the abutted edges 42 of the adjacent neck portions 20 and into the posts 60.

Figure 8:
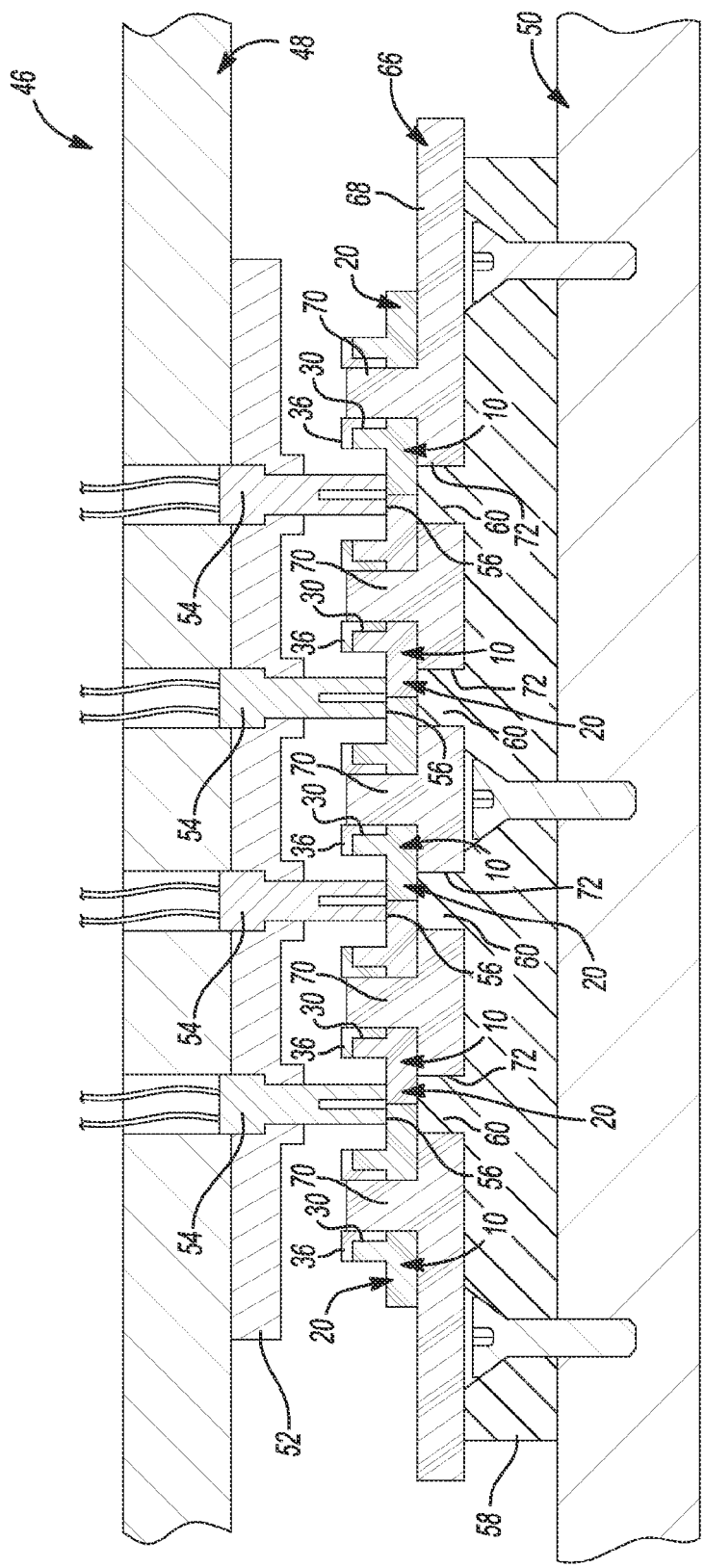
FIG. 8 is a cross-sectional view of the tools of FIGS. 4 and 5 having a carrier and a plurality of ear tags disposed therebetween.
Figure 9:
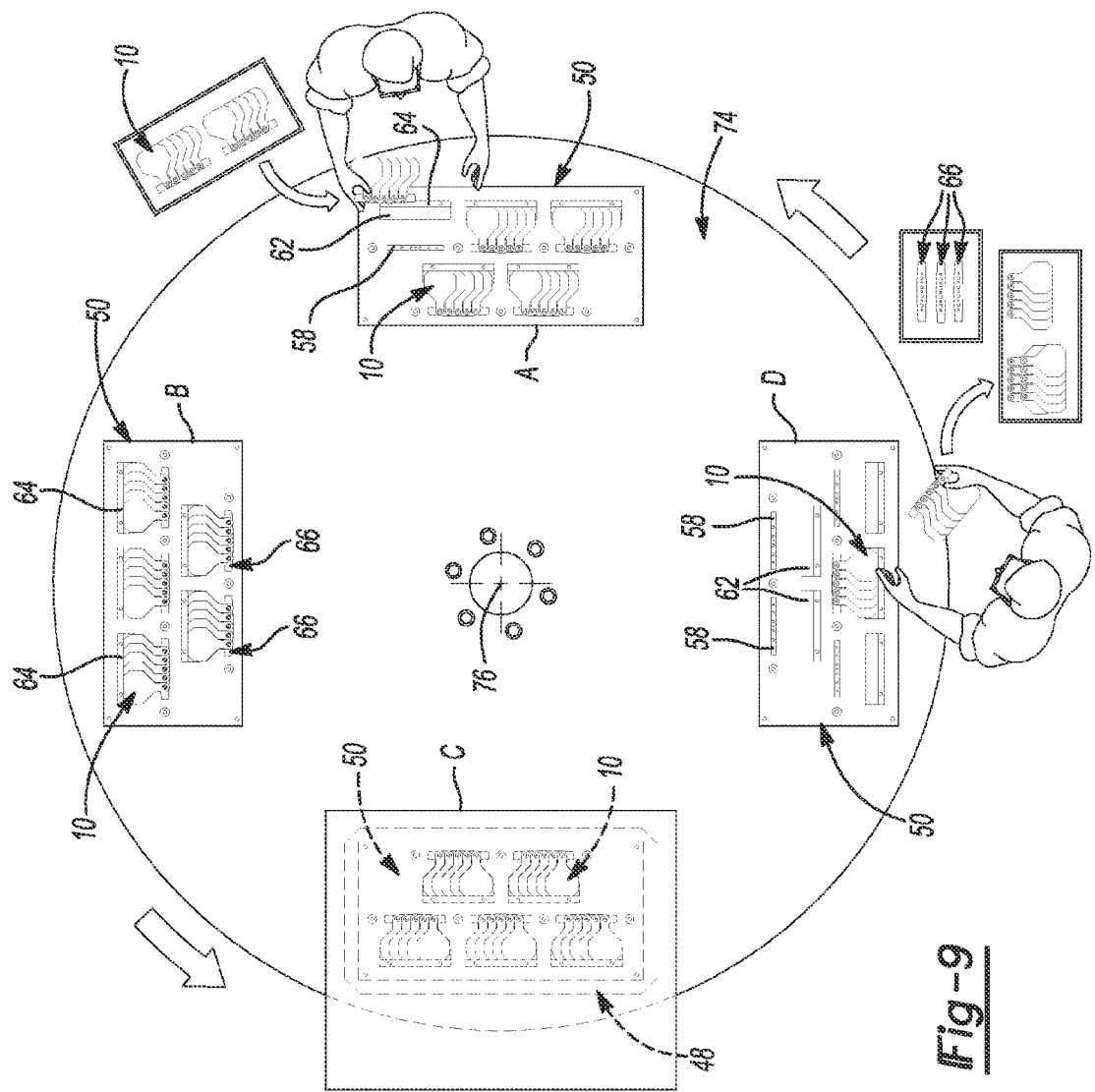
FIG. 9 is a top view of a turntable incorporating a series of lower tools in accordance with the principles of the present disclosure.

With particular reference to FIGS. 8 and 9, operation of the welding apparatus 46 will be described in detail. In one configuration, the welding apparatus 46 may include a single upper tool 48 and a series of lower tools 50 supported by a work table 74. In the configuration shown in FIG. 9, four such lower tools 50 are supported by the work table 74 and may be selectively positioned under the upper tool 48 when the work table 74 is rotated about a central axis 76. Permitting rotation of the work table 74 allows operators to concurrently load individual ear tags 10 and associated fixtures 66 onto a lower tool 50 and to remove welded ear tags 10 from another lower tool 50—all while concurrently performing a welding operation. For example, an operator may load individual ear tags 10 and accompanying fixtures 66 onto a lower tool 50 at station (A) while another set of ear tags 10 are welded at station (C). Furthermore, while the foregoing operations are being performed at stations (A) and (C), another operator may remove welded ear tags 10 from a lower tool 50 at station (D) while a series of ear tags 10 and associated fixtures 66 wait to be welded at station (B).

The ear tags 10 are individually formed via an injection-molding process, as described above. Further, the indicia 16 may be printed on one or more of the front surface 22 and rear surface 24 of the panel portion 18 of each ear tag 10 prior to the ear tags 10 being welded together. Once the individual ear tags 10 are formed and the indicia 16 printed thereon, the individual ear tags 10 may be attached to fixtures 66 at station (A). Specifically, each ear tag 10 may be positioned relative to the fixture 66 such that each post 70 of the fixture 66 receives the collar 36 of an individual ear tag 10. As shown in FIG. 6, the fixture 66 may include five (5) posts 70 and, thus, each fixture 66 may support and position five (5) individual ear tags 10 relative to a lower tool 50. Once the fixture 66 is loaded with individual ear tags 10, the fixture 66 may be located on the lower tool 50 and positioned relative thereto by inserting the posts 60 of the lower tool 50 into respective apertures 72 of the fixture 66. Once each plate 58 of the lower tool 50 includes a fixture 66, the work table 74 may be indexed to allow the lower tool 50—complete with fixtures 66 and individual ear tags 10—to be moved from station (A) to station (C) for welding.

The lower tool 50 may be positioned relative to the upper tool 48 such that the electrodes 54 of the upper tool 48 are opposed to the posts 60 of the lower tool 50. Because the posts 60 extend through the fixture 66, the posts 60 oppose the rear surface 34 of each neck portion 20 while the electrodes 54 oppose the front surface 32 of each neck portion 20 (FIG. 8). At this point, the upper tool 48 may be moved relative to the lower tool 50 to bring the electrodes 54 into contact with the front surface 32 of each neck portion 20, thereby sandwiching the neck portion 20 between the electrodes 54 of the upper tool 48 and the posts 60 of the lower tool 50. While the upper tool 48 is described as being moved toward the lower tool 50, the lower tool 50 could alternatively be moved toward the upper tool 48. Further, each tool 48, 50, may be moved relative to one another to sandwich the neck portions 20 of adjacent ear tags 10 between the electrodes 54 and the posts 60 at the edge 42 of each neck portion 20.

Once the electrodes 54 are brought into proximity with the posts 60 such that the neck portions 20 of adjacent ear tags 10 are sandwiched between the electrodes 54 and the posts 60, current may be supplied to the electrodes 54 to generate electromagnetic energy, which flows from the electrodes 54 to the posts 60. In so doing, the electromagnetic energy flows through the abutted neck portions 20 of adjacent ear tags 10, thereby causing the material of each neck portion 20 to flow and mix with one another. Current may be supplied to the electrodes 54 for approximately five (5) to ten (10) seconds, after which the electrodes 54 are moved away from the posts 60.

Once the electrodes 54 are moved away from the posts 60, the work table 74 may rotate about the central axis 76 until the welded ear tags 10 are moved from station (C) to station (D). At this point, an operator may remove the welded ear tags 10 and associated fixtures 66 from the lower tool 50. Further, the operator may remove the fixtures 66 from the welded ear tags 10 as the ear tags 10 are fixed relative to one another, thereby obviating the need for the fixture 66. The fixture 66 may be reused to attach subsequent ear tags 10 or, alternatively, may be recycled.

The welded ear tags 10 may be attached to one another in a proper numerical or alphanumerical sequence to allow an end user to likewise sequentially tag animals 12. The welds formed at the edges 42 of adjacent neck portions 20 maintain the proper sequence of the individual ear tags 10 until a force is applied to each ear tag 10 generally at the attachment location 44 to sever the attachment location 44 and remove each individual ear tag 10. The ear tag 10 may be attached to the animal's ear 14 following removal of the ear tag 10 from an adjacent ear tag 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A plurality of ear tags each having a panel portion and a relatively narrow neck portion extending from the panel portion, the plurality of ear tags being arranged so that said panel portions of adjacent ear tags are partially overlapped and the neck portions of adjacent ear tags are non-overlapped and positioned side-by-side so that the edges of said neck portions of adjacent ear tags are juxtaposed and attached to one another at an attachment location at the edges of said neck portions of said adjacent ear tags;
    wherein said edges of said neck portions are attached to one another via a weld.

2. The plurality of ear tags of claim 1, wherein said edges of said neck portions are attached to one another via radio-frequency welding, ultrasonic welding, hot-gas welding, friction welding, laser welding, spin welding, or via a heat stake.

3. The plurality of ear tags of claim 1, wherein said attachment location is disposed above a flex point of said neck portions.

4. The plurality of ear tags of claim 1, wherein said neck portions each include an aperture formed therethrough.

5. The plurality of ear tags of claim 4, wherein said attachment location is disposed between apertures of adjacent neck portions.

6. The plurality of ear tags of claim 1, wherein said edges of abutting neck portions are deformed at said attachment location and cooperate to form a substantially circular shape.

7. A method of packaging a plurality of ear tags, comprising:
    forming a plurality of individually separate ear tags each having a panel portion and a relatively narrow neck portion extending from said panel portion;
    arranging said plurality of ear tags so that said panel portions of adjacent ear tags are partially overlapped;
    arranging said plurality of ear tags so that the neck portions of adjacent ear tags are non-overlapped and positioned side-by-side so that the edges of said neck portions of adjacent ear tags are juxtaposed; and
    attaching said edges of said neck portions of said adjacent ear tags.

8. The method of claim 7, wherein attaching said edges of said neck portions includes forming an attachment location between each of said adjacent ear tags.

9. The method of claim 7, wherein attaching said edges of said adjacent neck portions of said adjacent ear tags includes deforming said edges.

10. The method of claim 7, wherein attaching said edges of said adjacent neck portions of said adjacent ear tags includes forming an attachment location having a circular shape.

11. The method of claim 7, wherein attaching said edges of said neck portions of said adjacent ear tags includes one of radio-frequency welding, ultrasonic welding, hot-gas welding, friction welding, laser welding, spin welding, or heat staking.

12. The method of claim 7, wherein attaching said edges of said neck portions of said adjacent ear tags includes attaching said edges above a flex point of said neck portions.

13. The method of claim 7, wherein attaching said edges of said neck portions of said adjacent ear tags includes welding adjacent neck portions.

14. A method of packaging a plurality of ear tags, comprising:
   forming a plurality of individually separate ear tags each having a panel portion and a relatively narrow neck portion extending from said panel portion;
   arranging said plurality of ear tags so that said panel portions of adjacent ear tags are partially overlapped;
   arranging said plurality of ear tags so that said neck portions of adjacent ear tags are positioned side-by-side and in contact with one another along a side edge thereof; and
   welding said plurality of individual ear tags to one another at said neck portions.

15. The method of claim 14, wherein arranging said plurality of ear tags so that said neck portions of adjacent ear tags are non-overlapped and abutting side edges of said adjacent neck portions.

16. The method of claim 15, wherein welding said plurality of individual ear tags includes welding abutting side edges of said neck portions.

17. The method of claim 15, wherein welding said plurality of individual ear tags includes one of radio-frequency welding, ultrasonic welding, hot-gas welding, friction welding, laser welding, spin welding, or heat staking.

18. The method of claim 15, wherein welding said plurality of individual ear tags includes welding said neck portions above a flex point of said neck portions.

19. The method of claim 15, wherein welding said plurality of individual neck portions includes forming a weld having a substantially circular shape.

20. The plurality of ear tags of claim 1, wherein the panel portions of said tags are imprinted with numerical indicia and further wherein the numerical indicia on adjacent ear tags is sequential.

21. The method of claim 7, further including the steps of applying numerical indicia on the panel portions of said tags and arranging the plurality of tags so that the numerical indicia on adjacent tags is sequential.

22. The method of claim 14, further including the steps of applying numerical indicia on the panel portions of said tags and arranging the plurality of tags so that the numerical indicia on adjacent tags is sequential.

\* \* \* \* \*